US008379829B2

(12) United States Patent
Schaff et al.

(10) Patent No.: US 8,379,829 B2
(45) Date of Patent: Feb. 19, 2013

(54) SYSTEM AND METHOD FOR INCOMING TELEPHONE CALL DISTRIBUTION AMONG INBOUND LINKS OF SERVICE PLATFORMS

(75) Inventors: Jonathan E. Schaff, San Leandro, CA (US); Dominick Mangiardi, Fremont, CA (US); Cory Yang, Fremont, CA (US); Brian Patrick Hulett, Overland Park, KS (US); James D. Kirby, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 655 days.

(21) Appl. No.: 12/643,066

(22) Filed: Dec. 21, 2009

(65) Prior Publication Data

US 2010/0091771 A1 Apr. 15, 2010

Related U.S. Application Data

(63) Continuation of application No. 11/348,715, filed on Feb. 7, 2006, now Pat. No. 7,664,250.

(51) Int. Cl.
*H04M 7/00* (2006.01)

(52) U.S. Cl. ............... 379/221.09; 379/265.02

(58) Field of Classification Search ............. 379/221.09, 379/265.02
See application file for complete search history.

(56) References Cited

U.S. PATENT DOCUMENTS

| 2002/0159470 | A1* | 10/2002 | Atarashi et al. | 370/441 |
| 2005/0009529 | A1* | 1/2005 | Chen et al. | 455/450 |
| 2005/0054358 | A1* | 3/2005 | Zhang et al. | 455/509 |
| 2006/0116080 | A1* | 6/2006 | Eom | 455/62 |

* cited by examiner

*Primary Examiner* — Creighton Smith

(57) ABSTRACT

A method for distributing incoming telephone calls among inbound links of a service platform is provided. First information is accumulated regarding routing of the incoming telephone calls during a previous time period to the inbound links of the service platform by a network call processor. Second information including a number of the inbound links of the service platform allocated to the network call processor for a future time period is generated based on the first information. A number of the incoming telephone calls are routed to the inbound links of the service platform during the future time period based on the second information.

20 Claims, 14 Drawing Sheets

| MESSAGE TYPE | SOURCE | DESTINATION |
|---|---|---|
| INITIALIZE | SP | SCP |
| ACKNOWLEDGE | SCP | SP |
| ERROR | SP, SCP | SP, SCP |
| DISCONNECT | SP, SCP | SP, SCP |
| DISCONNECT COMPLETE | SP, SCP | SP, SCP |
| CHANNEL ALLOCATION | SP | SCP |
| CHANNEL ALLOCATION RESPONSE | SCP | SP |

FIG. 7

| BYTE NUMBER | INFORMATION |
|---|---|
| 0 | MESSAGE TYPE |
| 1 | ORIGINATOR ID |
| 2 | DATE/TIME STAMP |
| 3 | |
| 4 | |
| 5 | |
| 6 | MESSAGE LENGTH |
| 7 | |
| 8-N | MESSAGE CONTENTS |

FIG. 8

| TABLE A (CHANNELS AVAILABLE) | | | |
|---|---|---|---|
| TIME PERIOD | -2 | -1 | 0 |
| VALUE | A(-2) | A(-1) | A(0) |

| TABLE U (CHANNELS IN USE) | | | |
|---|---|---|---|
| TIME PERIOD | -2 | -1 | 0 |
| VALUE | U(-2) | U(-1) | U(0) |

| TABLE I (CALL INITIATIONS PER SCP) | | | |
|---|---|---|---|
| TIME PERIOD / INDEX | -2 | -1 | 0 |
| 1 (SCP 1) | I(1, -2) | I(1, -1) | I(1, 0) |
| 2 (SCP 2) | I(2, -2) | I(2, -1) | I(2, 0) |
| 3 (SCP 3) | I(3, -2) | I(3, -1) | I(3, 0) |
| 4 (SCP 4) | I(4, -2) | I(4, -1) | I(4, 0) |
| 5 (TOTAL) | I(5, -2) | I(5, -1) | I(5, 0) |

FIG. 9

TABLE P (SERVICE PLATFORM INFORMATION)

| SP_IDENTIFIER | SP_INDEX | INITIATIONS | EXHAUSTED |
|---|---|---|---|
| XX | 1 | INITS(1) | EXH(1) |
| YY | 2 | INITS(2) | EXH(2) |
| ... | ... | ... | ... |

TABLE AA (ALLOCATIONS AVAILABLE)

| SP_INDEX | ALLOCATION |
|---|---|
| 1 | AA(1) |
| 2 | AA(2) |
| ... | ... |

TABLE RL (ROUTING LIST)

| LIST_INDEX | SP_INDEX | USED (0/1) (NO/YES) |
|---|---|---|
| 1 | RL(1).SP_INDEX | RL(1).USED |
| 2 | RL(2).SP_INDEX | RL(2).USED |
| ... | ... | ... |
| LIST_LENGTH | RL(LIST_LENGTH).SP_INDEX | RL(LIST_LENGTH).USED |

TABLE NA (NUMBER ALLOCATED)

| SP_INDEX | NUMBER ALLOCATED |
|---|---|
| 1 | NA(1) |
| 2 | NA(2) |
| ... | ... |

TABLE FAA (FRACTIONAL ALLOCATIONS AVAILABLE)

| SP_INDEX | FRACTIONAL ALLOCATIONS AVAILABLE |
|---|---|
| 1 | FAA(1) |
| 2 | FAA(2) |
| ... | ... |

TABLE FA (FRACTION ALLOCATED)

| SP_INDEX | FRACTION ALLOCATED |
|---|---|
| 1 | FA(1) |
| 2 | FA(2) |
| ... | ... |

TABLE FD (FRACTION DISCREPANCY)

| SP_INDEX | FRACTION DISCREPANCY |
|---|---|
| 1 | FD(1) |
| 2 | FD(2) |
| ... | ... |

SYSTEM AND METHOD FOR INCOMING TELEPHONE CALL DISTRIBUTION AMONG INBOUND LINKS OF SERVICE PLATFORMS

RELATED APPLICATIONS

This application is a continuation of and claims priority to U.S. patent application Ser. No. 11/348,715, entitled SYSTEM AND METHOD FOR INCOMING TELEPHONE CALL DISTRIBUTION AMONG INBOUND LINKS OF SERVICE PLATFORMS, which was filed on Feb. 7, 2006, and which is hereby incorporated by reference in its entirety.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to telephone communications, and more particularly to the distribution of incoming telephone calls among inbound links of service platforms.

2. Description of the Prior Art

Due to increasingly fierce competition in the global marketplace, customer service, or "customer care," has become an important facet of the overall business strategy of most large companies. Part of this service involves providing a contact point to which customers may direct questions, comments, concerns, requests and the like. Further, while automated, Internet-based contacts, such as e-mail addresses and web-page Uniform Resource Locators (URLs) are widely provided to customers, many people remain more comfortable with the use of the telephone. By way of a simple phone number, such as an '800' number, the customer can often engage in free, fast, direct and interactive contact with a representative of the company.

Many larger businesses devote substantial resources in terms of technology and manpower to provide phone access for its customers. Oftentimes, dozens or hundreds of telephones, possibly located in disparate areas of the world, and each manned by a customer service representative, are required to field the typically large volume of incoming calls. Accordingly, routing these calls in a timely manner to an available representative, or "agent," can be a daunting task.

FIG. 1 provides a simplified example of a telephone communication system 1 for routing phone calls within such an environment. A company 2 may provide several service platforms 4a, 4b, 4c, each of which provides the capacity to field several phone calls from over one or more collections of phone lines, or "channels," 6a, 6b, 6c. In this example, each of the channels 6 is coupled with a switch 8 for connecting a phone 10, such as a customer telephone, to a phone of one of the service platforms 4. Various switches and other communication devices likely coupling the various components of FIG. 1 are not shown for the sake of simplicity.

The decision as to which channel 6 to connect with the customer phone 10 is performed by way of a Service Control Point (SCP) 12 coupled with the switch 8. The SCP 12 is part of a signaling system, such as Signaling System 7 (SS7), used for call routing and other call management functions in an intelligent telephone network. The SCP 12 acquires signal information such as the identity of an 800 number being called from the phone 10. This information is then used to query a Routing Processor (RP) 14 of the company 2 by way of a communication link 16, such as an X.25 interface link. The RP 14 uses the query, in addition to information received from one or more of the service platforms 4, to determine how the pending call should be routed. The RP 14 informs the SCP 12 of the desired route of the call by identifying the appropriate channel 6, typically by way of a "label." In response, the SCP 12 controls the switch 8 to complete the connection between the phone 10 and the particular service platform 4 associated with the channel 6 identified by the RP 14.

Typically, the RP 14 accounts for a number of factors in determining the most efficient route for an incoming call. However, the availability of in-bound channels to each of the service platforms 4 is currently treated as a static factor in such a system 1. For example, fewer agents may be available during a particular time, or a hardware defect may cause a channel 6 or an entire service platform 4 to become inoperative. Thus, fluctuations in the availability of these channels 6, which may change significantly within a short period of time, are not considered by the RP 14, due primarily to a lack of current information from each of the service platforms regarding channel availability. Such information typically must be discovered by a human operator, who must then manually configure the RP 14 to account for the change in availability in the routing of calls to the service platforms 4.

In addition, in the system 1 each incoming call initiates a query and response exchange between the SCP 12 and the RP 14. As a result, the number of calls that may be processed within a given period of time is limited at least by throughput restrictions of the link 16 coupling the SCP 12 and the RP 14.

Also, as shown in FIG. 1, the RP 14 is typically operated by the company 2 hosting the service platforms 4, thus adding the extra burdens of support, maintenance and upgrading of that particular system atop the already numerous tasks for which the company 2 is responsible.

SUMMARY OF THE INVENTION

One embodiment of the invention, described below, provides a method for distributing incoming telephone calls among inbound links of a service platform. First information regarding routing of the incoming telephone calls during a previous time period to the inbound links of the service platform by a network call processor is accumulated. Second information including a number of the inbound links of the service platform allocated to the network call processor for a future time period is generated based on the first information. A number of the inbound telephone calls are routed to the inbound links of the service platform during the future time period based on the second information.

Another embodiment provides a telephone call distribution system which includes a service platform comprising inbound links for incoming telephone calls. A network call processor coupled to the service platform is configured to generate first information regarding routing of the incoming telephone calls to the inbound links of the service platform during a previous time period. The network call processor is also configured to transfer the first information to the service platform. The service platform is configured to receive the first information, to generate second information including a number of the inbound links of the service platform allocated to the network call processor for a future time period based on the first information, and to transfer the second information to the network call processor. The network call processor is further configured to receive the second information, and to route a number of the inbound telephone calls to the inbound links of the service platform during the future time period based on the second information.

Additional embodiments and advantages of the present invention will be ascertained by those skilled in the art upon perusal of the following detailed description, taken in conjunction with the accompanying drawings.

BRIEF DESCRIPTION OF THE DRAWINGS

FIG. 7 is a table summarizing possible messages transferable between a service control point and a service platform according to an embodiment of the invention.

FIG. 8 is a table illustrating a possible message format according to an embodiment of the invention for messages transferred between a service control point and a service platform.

FIG. 9 depicts a set of tables employable by a service platform for determining a number of inbound channels to be allocated to one or more service control points according to an embodiment of the invention.

FIGS. 11 and 12 depict a set of tables employed within a service control point for generating and maintaining a routing list for routing calls among inbound channels of one or more service platforms according to an embodiment of the invention.

DETAILED DESCRIPTION OF THE INVENTION

Figure 1:
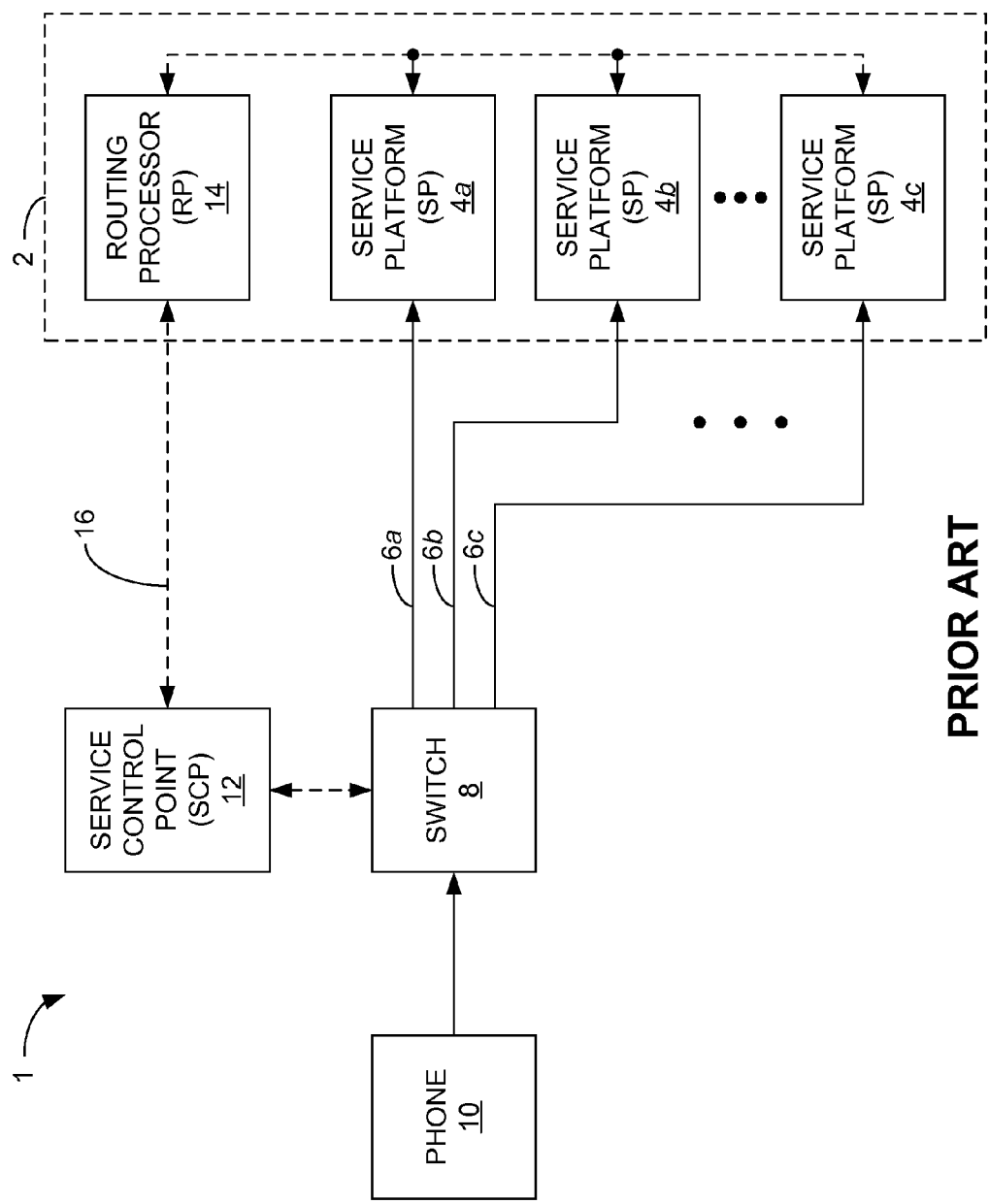
FIG. 1 is a simplified block diagram of a telephone communication system from the prior art.
Figure 2:
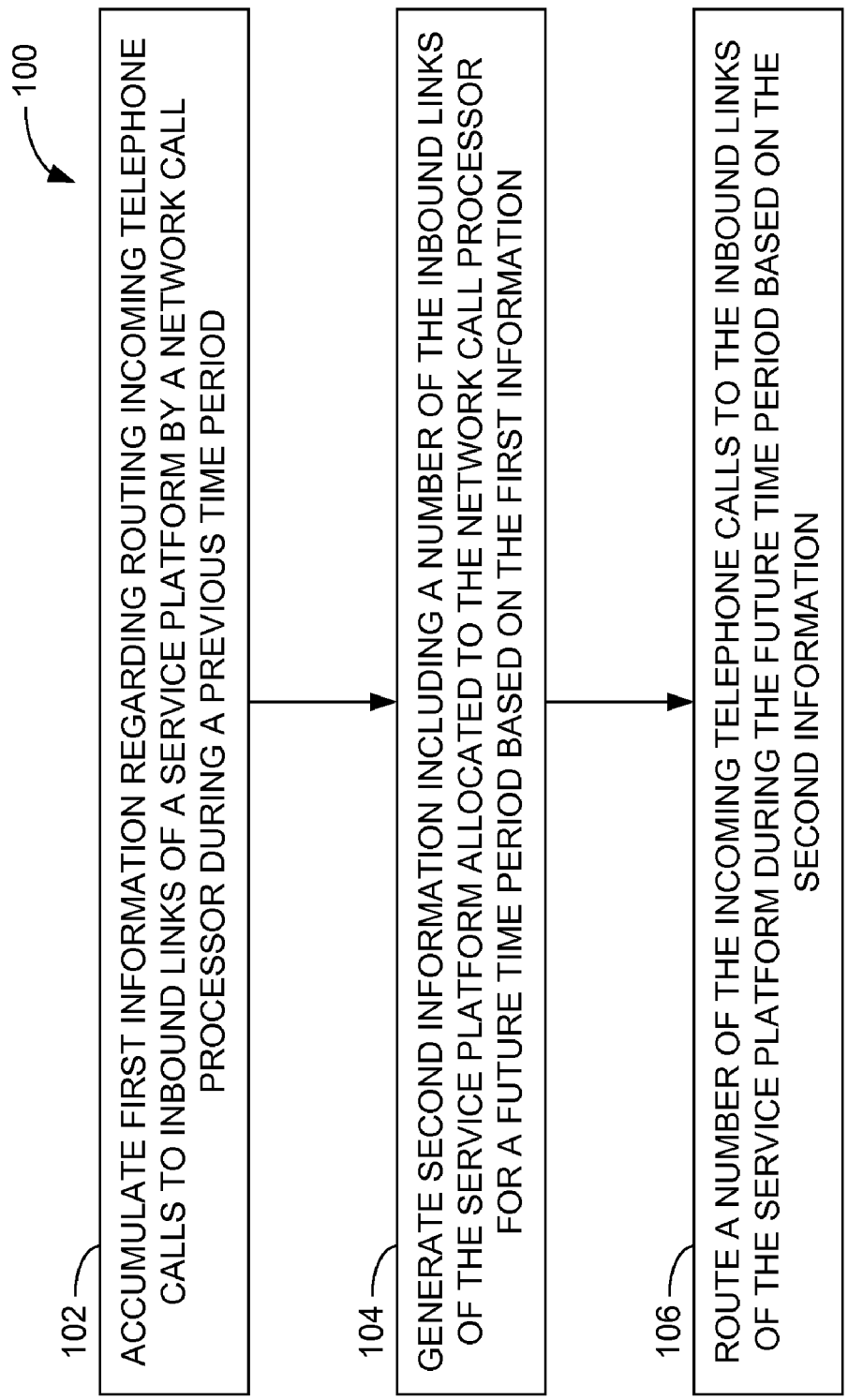
FIG. 2 is a method of distributing incoming telephone calls according to an embodiment of the invention.

A method 100 of distributing incoming telephone calls among inbound links of a service platform according to an embodiment of the invention is illustrated in the flow diagram of FIG. 2. First information regarding routing the incoming telephone calls to the inbound links of the service platform by a network call processor during a previous time period is accumulated (operation 102). Second information including a number of the inbound links of the service platform allocated to the network call processor for a future time period is generated based on the first information (operation 104). A number of the inbound telephone calls is routed to the inbound links of the service platform during the future time period based on the second information (operation 106).

Figure 3:
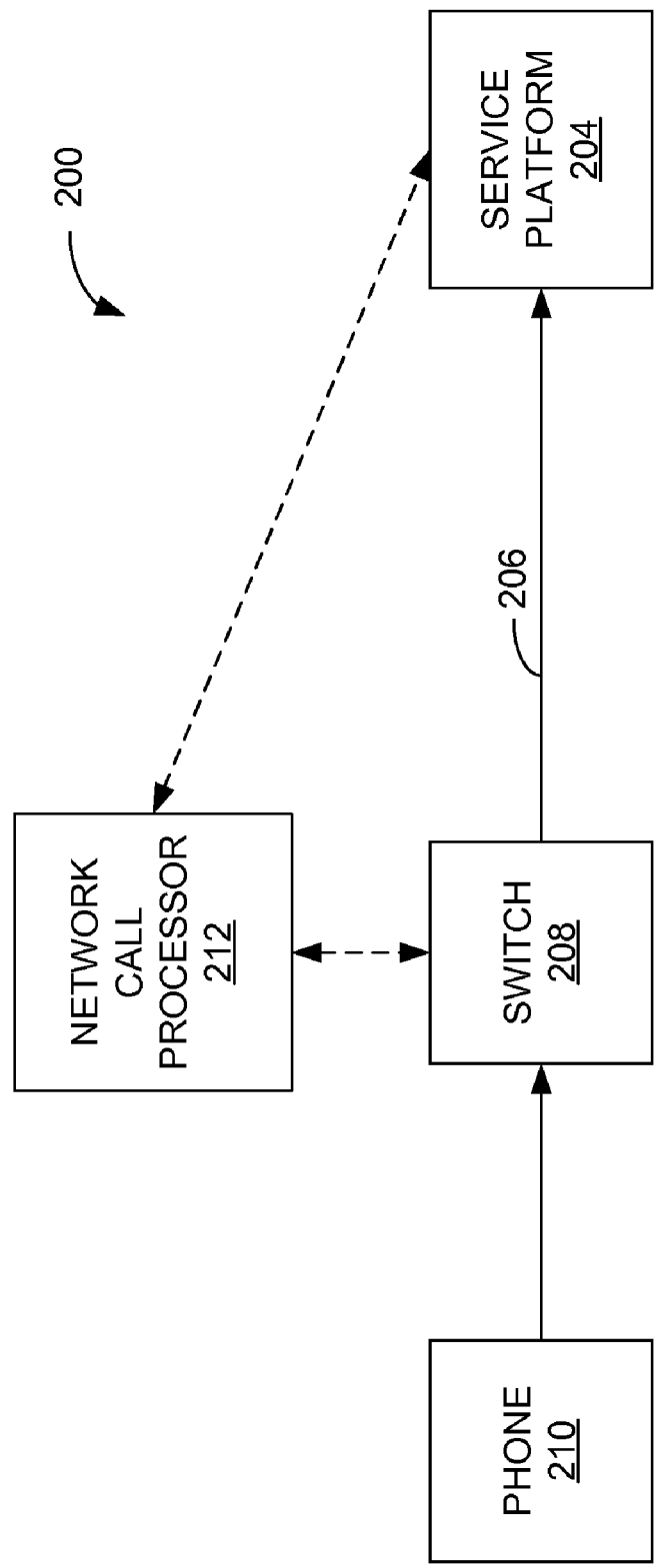
FIG. 3 is a telephone call distribution system according to an embodiment of the invention.

Another embodiment of the invention provides a telephone call distribution system 200, depicted in the block diagram of FIG. 3. Included is a service platform 204 having inbound links 206 for incoming telephone calls, such as from a telephone 210. Coupled with the service platform 204 is a network call processor 212 configured to generate first information regarding routing of the incoming telephone calls to the inbound links 206 of the service platform 204 during a previous time period. The network call processor 212 is also configured to transfer the first information to the service platform 204. The service platform 204 is configured to receive the first information, to generate second information comprising a number of the inbound links 206 of the service platform 204 allocated to the network call processor 212 for a future time period based on the first information, and to transfer the second information to the network call processor 212. The network call processor 212 is further configured to receive the second information, and to route a number of the inbound telephone calls to the inbound links 206 of the service platform 204 during the future time period based on the second information. In one embodiment, the network call processor 212 routes the incoming calls by way of switch 208.

Figure 4:
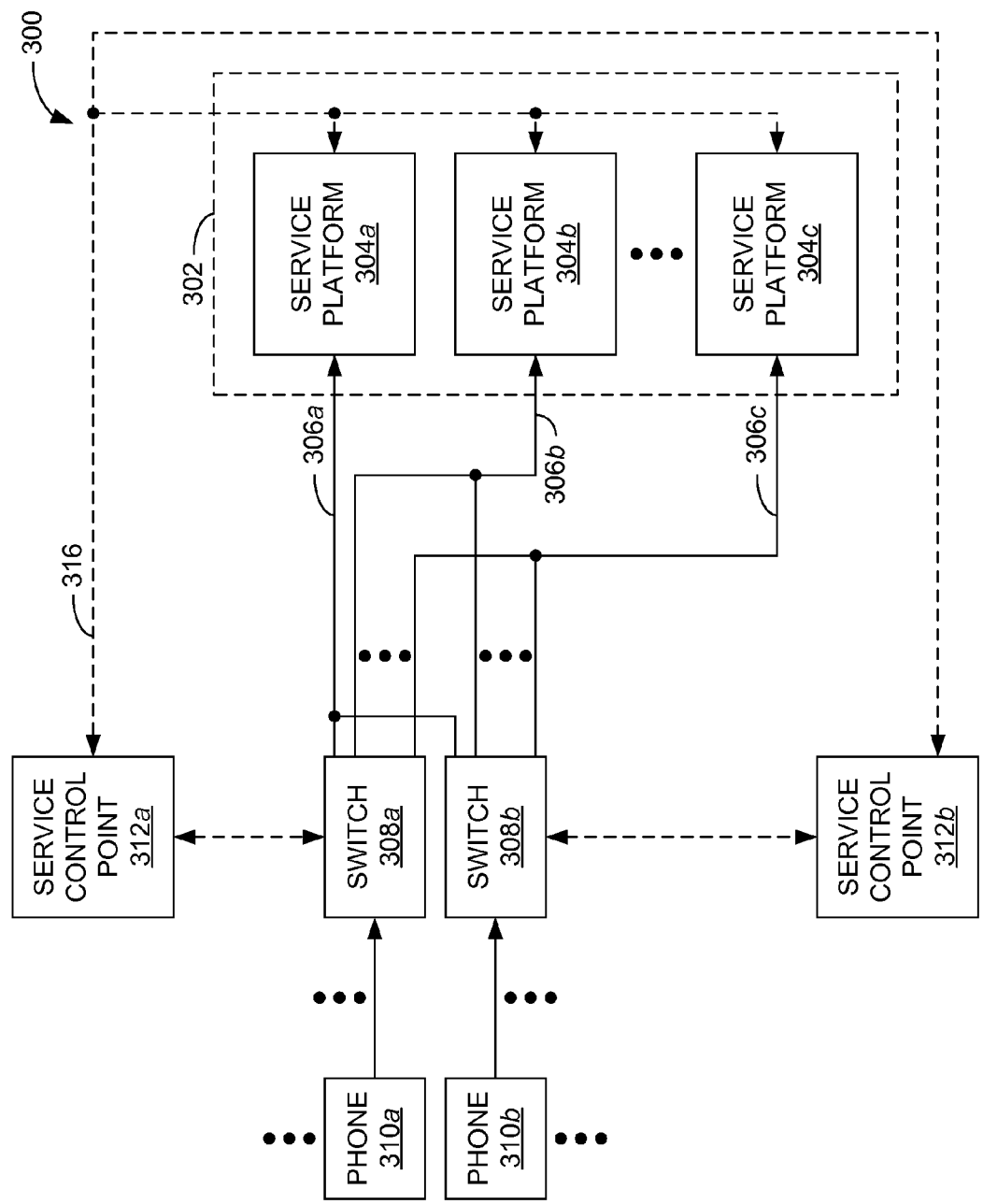
FIG. 4 is a telephone call distribution system according to another embodiment of the invention.
Figure 5:
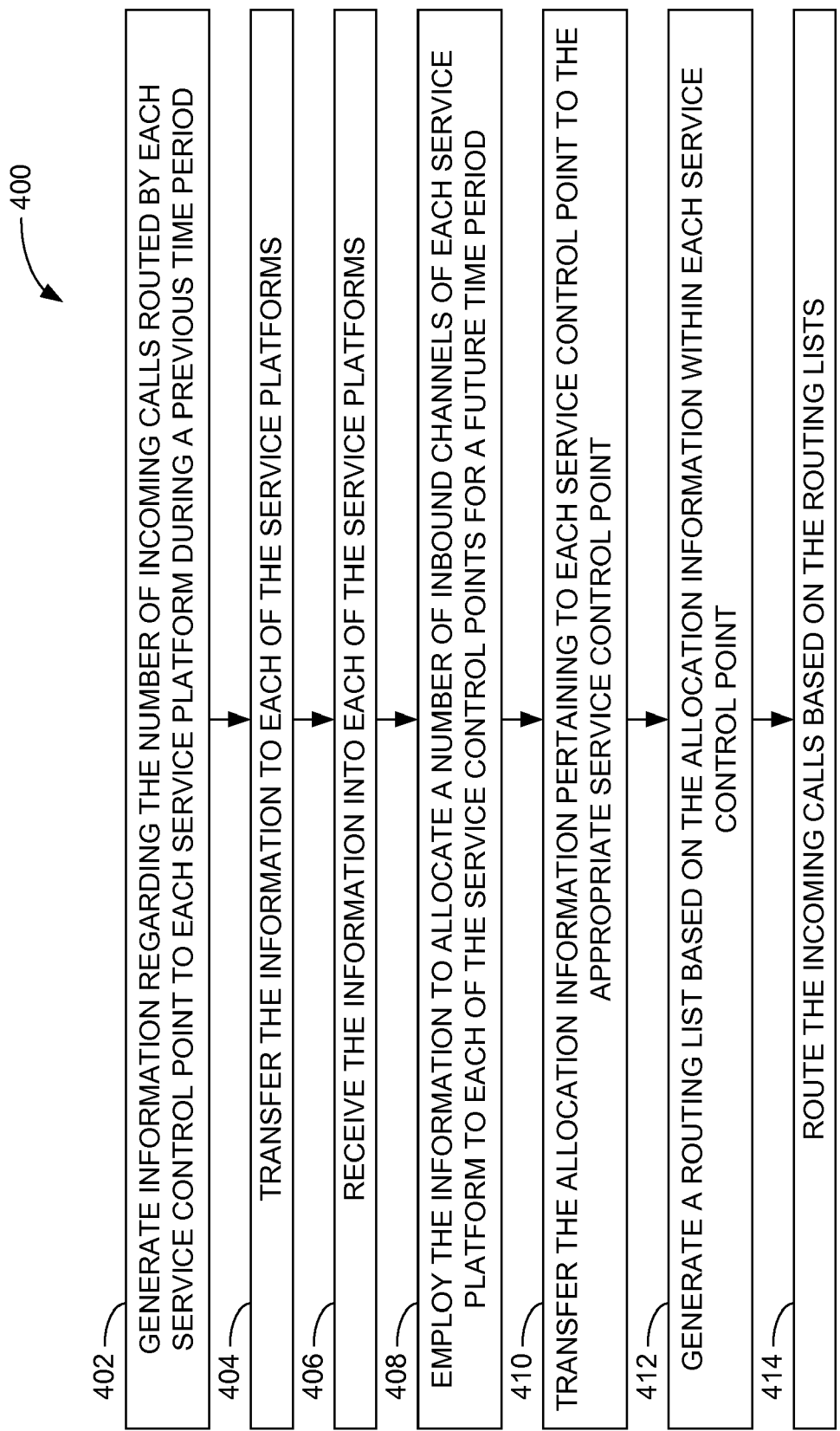
FIG. 5 is a method of distributing incoming telephone calls according to another embodiment of the invention.

A block diagram of another embodiment of the invention, a telephone system 300 for distributing incoming telephone calls among inbound telephone links, is presented in FIG. 4. Also, FIG. 5 provides a method 400 of distributing incoming telephone calls among inbound telephone links in conjunction with the system 300, although other systems may be employed which perform the method 400 operations discussed below.

The telephone system 300 includes multiple service platforms 304a, 304b, 304c, each of which provides a number of inbound telephone links 306a, 306b, 306c, respectively. In the particular embodiment of FIG. 4, the inbound links 306 are time-division-multiplexed (TDM) channels provided for each service platform 304. In other implementations, the inbound links 306 may be packet addresses, which are employed to direct communication packets to one of the service platforms 304, or to a specific agent coupled with one of the service platforms 304. For example, such packet addresses may be Internet Protocol (IP) packet addresses defining IP links or connections between the phone 210 and the service platforms 304.

In one embodiment, each of the service platforms 304 may be a call center provided by a company 302 for fielding toll-free access phone calls, such as "800" series telephone calls. The call centers may be located in geographically distinct areas, so as to provide phone-accessible customer service in multiple languages. Alternatively, the various call centers may each handle different types of requests from customers making a toll-free call. In another implementation, the call centers each have the same capabilities, thus providing the capacity for handling large volumes of calls from customers.

Each of the service platforms 304 may be configured to support hundreds or thousands of incoming calls over its respective channels 306 by way of customer representatives or agents. In some cases, some of the calls may be handled in a completely automated fashion by way of a computer system (not shown) adapted to provide answers to a variety of questions commonly posed by customers.

In the specific example of FIG. 4, a pair of phone line switches 308a, 308b couple each of the service platforms 304 with a phone 310a, 310b of a customer, respectively, by way of a set of channels 306. FIG. 4 represents a rather simplified view of the connections between the phones 310 and the service platforms 304, as other switches and communication devices may be involved in those connections. Such devices have been omitted to promote clarity regarding the discussion of various embodiments of the invention presented herein. In other embodiments, more or fewer switches 308 may be employed to connect any number of phones 310 to the service platforms 304.

Each customer phone 310 may be a standard Plain Old Telephone Service (POTS) phone, a wireless phone, a Voice over Internet Protocol (VoIP) enabled communication device, or any other communication device that may be coupled with one of the service platforms 304 for communication therewith.

Each of the switches 308a, 308b is controlled by a network call processor 312a, 312b, respectively. In the particular example of FIG. 4, the network call processors 312 are service control points 312. However, other network call processors, such as "soft" switches, gateway controllers, switch processors, and the like, may also be employed in other embodiments of the invention.

In FIG. 4, each service control point 312 connects an incoming call from the customer phone 310 coupled with the switch 308 to one of the service platforms 304. In one embodiment, the service control points 312 are service control points employed in a Signaling System 7 (SS7) system, an out-of-band signaling system employed to help promote efficient call routing, as well as other administrative functions, within a Public Switched Telephone Network (PSTN). In other examples, the service control points 312 may be nodes providing similar capability in another telephone signaling system.

In one embodiment, each service control point 312 is configured to route calls from the customer phone 310 and other telephones intended for a customer service representative or agent of the company 302. The decision as to which service platform 304 is connected with the customer phone 310 is based upon a direct exchange of information between the service control points 312 and the service platforms 304. As a result, an intervening external routing processor is not employed. The information between the service control points 312 and the service platforms 304 is carried over an Internet Protocol (IP) connection in one embodiment, although other types of communication links may be employed for this purpose in the alternative.

In one example, the information exchanged between the service control points 312 and the service platforms 304 aids in distributing incoming calls among the service platforms 304 in proportion to the number of inbound channels available for each service platform 304. Such a distribution is thought to provide the most efficient distribution of incoming calls among the platforms 304, thereby reducing delays in connecting customer phones 310 with agents of the company 302 that are possible due to, for example, a sudden increase in incoming call volume. Ultimately, such call distribution is likely to promote decreased caller frustration and enhanced customer satisfaction.

Each service control point 312 generates information regarding the number of incoming calls routed by the service control point 312 to each service platform 304 during a previous time period (operation 402 of FIG. 5). In one embodiment, this information is the number of calls initiated by the service control point 312 to the service platform 304 receiving the first information during the previous time period. The information is transferred over the communication link 316, such as an Internet Protocol connection, to each of the service platforms 304 substantially periodically (operation 404). For example, the information may be transmitted once every two minutes. In other implementations, the information may be transferred more sporadically, depending on the traffic demands on the telephone network 300 and other factors.

The service platforms 304 receive this information from each of the service control points 312 over the communication link 316 (operation 406). The service platforms 304 each then employ this information to allocate a number of its inbound channels to each of the service control points 312 for a future time period (operation 408). Each service platform 304 then transfers the allocation information pertaining to a service control point 312 to that particular service control point 312 over the communication link 316 (operation 410).

Figure 6:
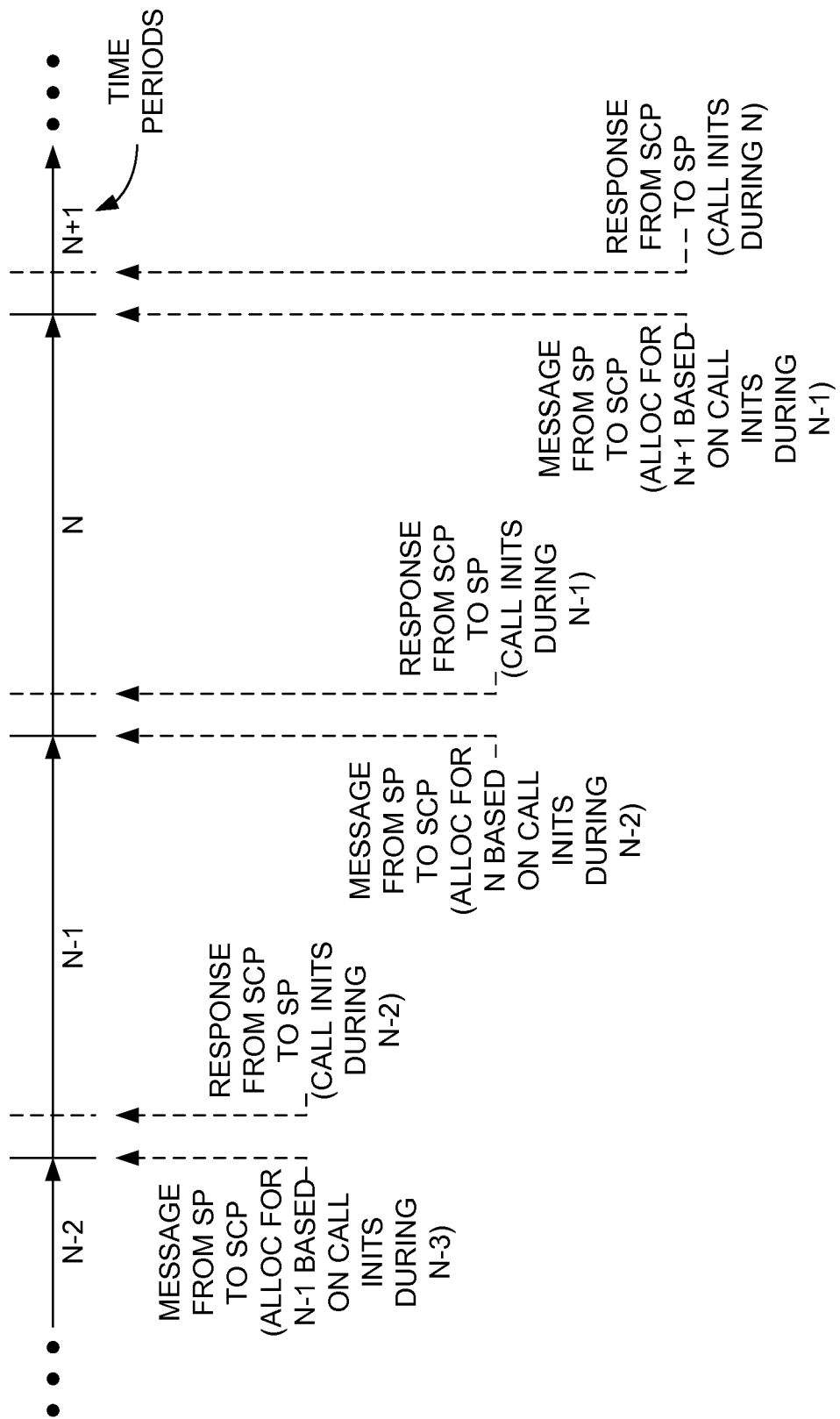
FIG. 6 is a timing diagram of an exchange of information between a service platform and a service control point according to an embodiment of the invention.

In one particular example, the information exchanged between the service platforms 304 and the service control points 312 occurs as part of a message-and-response exchange. More specifically, after each service platform 304 issues a "channel allocation" message to a service control point 312 indicating an allocation of inbound channels on the platform 304 for that service control point 312 for the next time period, the service control point 312 acknowledges receipt of that information by responding to the message with a "channel allocation response" message indicating the number of the call initiations during the immediately preceding time period. In this example, a call initiation is a connection made by the service control point 312 between a customer phone 10 and the service platform 304 via one of the inbound channels. That particular channel may still be in use by that call, or the call may have since been dropped, thus freeing up the associated channel. FIG. 6 provides a graphical illustration of the timing of this information exchange. For example, in response to a message from a service platform 304 to a service control point 312 indicating the number of inbound channels allocated to the service control point 312 for a time period N−1, the service control point 312 returns the number of calls initiated via the service control point 312 during the time period N−2 to the service platform 304. The service platform 304 then uses the initiated call information from the time period N−2 to provide call allocation information to the service control point 312 for future time period N. In response, the service platform 304 receives initiated call information from the service control point 312 covering time period N−1. This message exchange thus continues in a cyclical fashion.

In one implementation, the communication link 316 employs several message types in addition to the message and response indicated above regarding call initiations and channel allocations. For example, the need might exist for messages which initialize the connection between a particular service platform 304 and service control point 312 pair. Such a function may be implemented by way of an "initialize" message from the service platform 304 to the service control point 312 over the communication link 316, followed by an "acknowledge" message from the service control point 312 to the service platform 304. Also, terminating the connection between the service platform 304 and the service control point 312 may be accomplished by way of a "disconnect" message from either the service platform 304 or the service control point 312, answered by a "disconnect complete" message from the platform 304 or control point 312 receiving the disconnect message. Also, to indicate the presence of an error condition, an "error" message sourced by either the service platform 304 or the service control point 312 may be implemented. FIG. 7 presents a table summarizing these messages employed in this particular embodiment over the communication link 316.

In one particular example, each of the messages employed over the communication link 316 may include control information to aid the destination to interpret the messages. Such information may include a message header containing a message type, a source or originator ID, and a date/time stamp. Also included may be a length field indicating the size of the actual message contents. FIG. 8 presents such a possible message format including the control information.

In one embodiment, each service platform 304 allocates a number of inbound channels to each service control point 312 for a future time period based in part on the call initiations by the service control point 312 during a previous time period, as described above. For example, in reference to FIG. 6, the service platform 304 allocates a number of inbound channels to the service control point 312 for a time period N based on the latest call initiation information from the service control point 312 covering the time period N−2. As a result, the service platform 304 has approximately the length of one time period to calculate the channels allocated to the service control point 312 for each time period.

Figure 10:
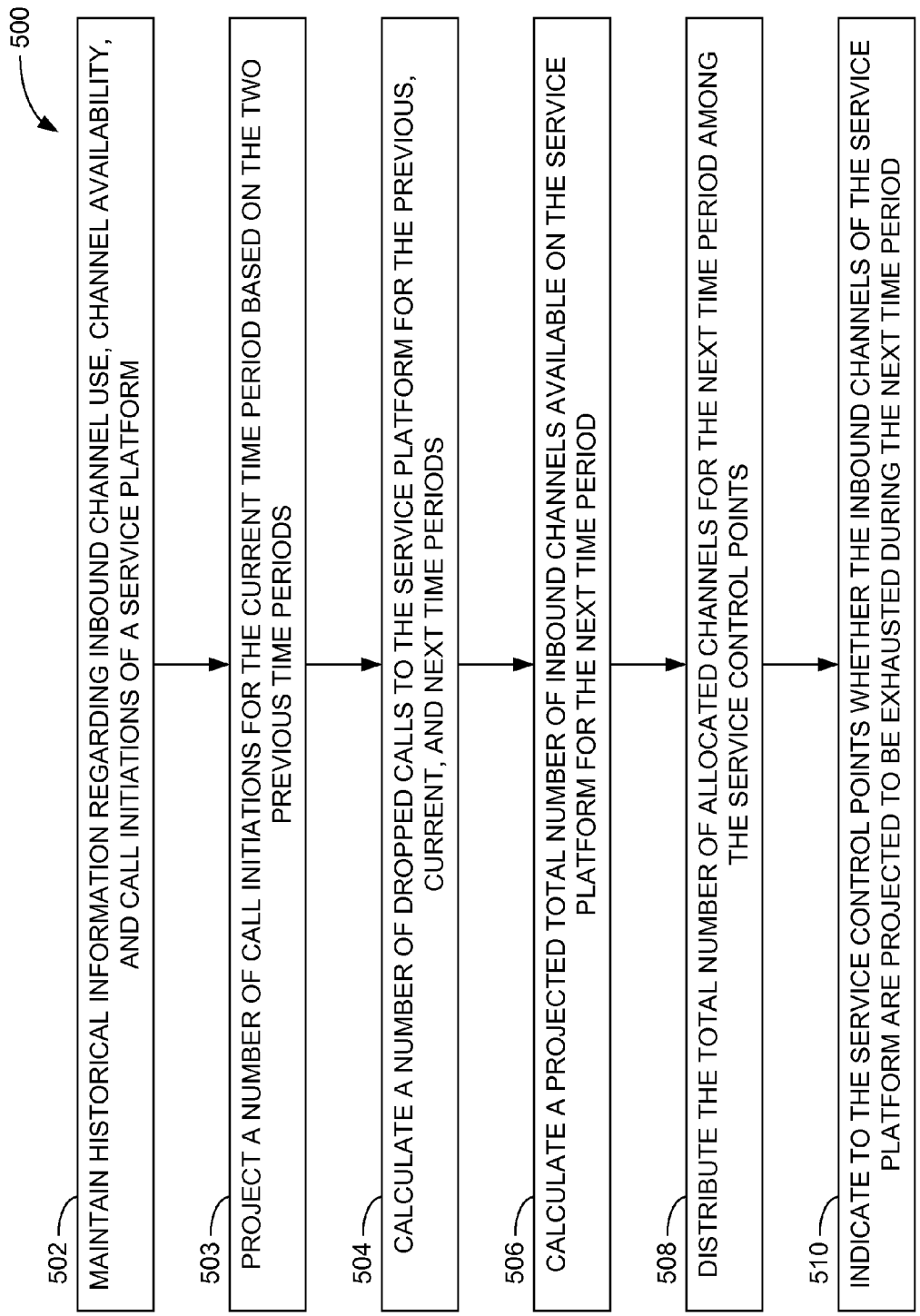
FIG. 10 is a flow diagram of a method for determining a number of inbound channels to be allocated to one or more service control points according to an embodiment of the invention.

In one implementation, the service platform 304 calculates the allocation for a particular service control point 312 using the call initiation information from the service control point 312 in conjunction with historical information obtained within the service platform 304 regarding inbound channel use and availability. These sources of information may then be combined arithmetically to determine a total projected number of channels available during the next time period. These channels may then be allocated among the various service control points 312 according to a projected number of call initiations for each of the control points 312. FIG. 10 provides a flow diagram of one particular embodiment of such a method 500 for generating the allocation information.

More specifically, each of the service platforms 304 may maintain the historical information in a series of tables shown in FIG. 9. For example, a running count of the available inbound channels 306 which service the platform 304 is maintained in Table A (operation 502 of FIG. 10). Also, a count of the number of inbound channels currently in use is held in Table U (also operation 502). In one example, these counts are maintained for the current time period (t=0) and the two previous time periods (t=−1 and t=−2), wherein the time periods may represent indices for the tables.

The service platform 304 also maintains a count of the number of call initiations for each service control point 312 over the two previous time periods in Table I, assuming four service control points 312 are being employed (also operation 502). Table I is a two-dimensional table indexed according to the service control point 312 providing the information. Also, an additional row (Row 5 in FIG. 9) is provided in Table I representing the sum of all call initiations for all of the service control points 312. Since each service control point 312 indicates the number of call initiations for each time period after the fact, the service platform 304 projects a number of call initiations for the current time period based on the two previous time periods (operation 503). In the specific example of FIG. 9, the values for the two previous time periods are averaged to obtain the corresponding value for the current time period.

As all of the channel allocation response messages are received by the service platform 312 from each of the service control points 312, the values of the Tables A, U and I are shifted to the next oldest time slot, and the received call initiation information is placed in Table I at the most recent time period at t=−1. The projected call initiation values for the current time period t=0 are then calculated as described above.

On the basis of this collected information, a number of dropped calls for the previous time period, termed D(−1), may be calculated as the number of call initiations from all of the service control points 312 for that period minus the increase in the number of inbound channels in use during the previous time period over the preceding time period (operation 504):

$$D(-1)=I(5,-1)-(U(-1)-U(-2))$$

Thereafter, if at least one channel is in use at the time period t=−2, a projected number of dropped calls for the current time period may be produced presuming the number of dropped calls remains proportional to the number of channels in use at the beginning of the current time period. Otherwise, the number of dropped calls may be carried over from the calculation for the previous time period (also operation 504):

If $U(-2)>0$, then $D(0)=(D(-1)*U(-1)/U(-2))$; else $D(0)=D(-1)$

A projected number of dropped calls for the next time period after the current time period, labeled D(1), may be generated in a similar fashion (operation 504):

If $U(-2)>0$ and $U(-1)>0$, then $D(1)=(D(-1)*U(0)/U(-2))$; else if $U(-1)>0$, then $D(1)=((D(0)*U(0)/U(-1))$; else $D(1)=(D(0))$ In one embodiment, a projected total number of inbound channels available PA on the service platform 304 is then calculated (operation 506) as the sum of the channels available during the current time period and the projected number of dropped calls for the next time period. In addition, a minimum number of total allocated channels for the next time period, termed MA, may be employed in lieu of the calculated value in case the calculated value yields a lower value:

$$PA=\max(MA, (A(0)+D(1))$$

Finally, the total number of allocated channels for the next time period is distributed among the various control service points 312 (operation 508). In one embodiment, the channels are allocated according to the proportion of the projected number of calls initiated by the particular control service point 312 for the current time period to the total projected number of initiated calls for that same time period. Thus, each service control point 312, labeled 'j' herein, will have its own channel allocation CA(j):

$$CA(j)=PA*I(j,0)/I(5,0)$$

In one embodiment, a minimum value for the channel allocation CA(j) for a particular service control point 312 can be provided by dividing the projected total number of inbound channels available PA by the number of service control points 312, which is four is this particular case. Providing such a minimum allows for a base amount of channel allocation for a service control point 312 that has been recently been idle. Without such a minimum, an extremely low allocation may be provided for the service control point 312, thus possibly causing congestion problems involving the service control point 312 once it becomes active.

While the process 500 discussed above for generating an allocated number of inbound channels of the service platform 304 for each service control point 312 may be employed, other embodiments utilizing other means may be employed in the alternative. For example, historical data collected within the service platform 304 and routing information from the service control points 312 covering more time periods prior to the current time period may be used to generate the allocations.

In addition, the service platform 304 may also provide an indication as to whether its inbound channels are projected to be exhausted during the next time period (operation 510). In one example, the service platform 304 determines a projected total number of call initiations for the current time period, labeled PI. As an example, this number may be determined from adding the number of dropped calls projected for the current time period to the growth in the number of used channels from the most recent time period to the current time period:

$$PI=D(0)+U(0)-U(-1)$$

If the projected total number of call initiations to the service platform 304 is greater than the number of channels projected to be available during the next time period, the calculation of which is described earlier, the inbound channels may be exhausted, or completely used by incoming calls, during the next time period. In other words, if PI>PA, then the inbound channels are projected to be exhausted during the next time period. In one embodiment, such an indication is made by the service platform 304 to each of the service control points 312 as part of the message carrying the number of channels allocated to the service control point 312 being transferred to the particular control point 312. Such an indication may serve to warn the service control point 312 of the possibility that other service platforms 304 may need to be relied upon for servicing incoming calls during the next time period.

Once a service control point 312 receives its channel allocation information from each of its associated service platforms 304, the service control point 312 may begin generating a routing list based on the received information (operation 412 of FIG. 5). The routing list provides a simple mechanism for the service control point 312 for determining to which service platform 304 the next incoming call should be routed (operation 414 of FIG. 5).

A maximum routing list length, termed "list_length," may be determined prior to generation of the list itself in case the amount of memory allocable to the list is limited. In one embodiment, the maximum list length, called "max_length" herein, may be determined by multiplying the total number of inbound channels of all service platforms 304 accessible by the service control point 312 (total_channels) by the length of the time period (time_period), and dividing by an average duration of a call (avg_call_curation), and one less than the total number of service control points 312 (num_SCP):

$$\text{max\_length}=(\text{total\_channels}*\text{time}_{13}\text{period})/(\text{avg\_call\_duration}*(\text{num\_SCP}-1))$$

Also, in some implementations a separate table, labeled Table P, may be initialized to correlate an identifier "SP_identifier" for each of the service platforms 304 with a service platform index, or "SP_index." Also associated with each service platform 304 may be an "initiations" (inits) field and an "exhausted" (exh) field which the control service point 312 updates during normal operations. The initiations value indicates the number of calls initiated for the associated service platform 304 during the current time period, while the exhausted value indicates whether the inbound channels of the service platform are exhausted, or completely utilized within the present time period, and thus not able to accept more calls. FIG. 11 provides a graphical representation of Table P.

In one embodiment, the SP_index for each service platform 304 is then utilized as an index to access an "allocations available" table, called Table AA, shown also in FIG. 11. When a channel allocation message is received from a particular service platform 304, the included channel allocation is stored at the index of Table AA associated with the service platform 304, as indicated by the information in Table P, described above. After an allocation message is received by each of the service platforms 304, the service control point 312 may then add each of the individual allocations to determine a total channel allocation, called "total_available." At this point, the service control point 312 then generates the channel allocation response message to each of the service platforms 304 using the appropriate initiations value from Table P, and then clearing the particular initiations value to zero to begin counting for the next time period.

At this point, the routing list is generated. In one example, the routing list takes the form of a table, labeled Table RL in FIG. 11, which includes a number of entries equal to the total channel allocation, limited by the max_length value calculated above. Each entry includes a field for the index of the service platform 304 associated with the entry, and an indicator as to whether that particular entry of the routing list RL is currently being used.

In one embodiment, a set of four working tables shown in FIG. 12 is initialized and employed to generate the routing list RL. First, a "number allocated" table (Table NA) contains an integer NA(i) associated with every service platform 304 "i" indicating a running count of the number of filled entries in the routing list RL reserved for that particular service platform 304 during the generation of the routing list RL. In addition, a total number of allocated channels, termed "total_NA," in the routing list RL is maintained as well. Each entry NA(i), as well as total_NA, is initialized to zero prior to the generation of the routing list RL.

Similarly, a "fraction allocated" table (Table FA in FIG. 12) holds a running value of the fraction NA(i) of the total number of filled entries in the routing list RL that are reserved for each of the service platforms 304 "i":

For each $SP\_index$ "$i$", $FA(i)=NA(i)/\text{total\_NA}$

In one embodiment, each of the fraction allocated values is a floating point value. In another example, each of the values is a fixed point value. Also, each value FA(i) is initialized to zero before generation of the routing list RL commences.

In addition, a "fractional allocations available table" (Table FAA in FIG. 12) provides a value FAA(i) for each service platform 304 "i" indicating the fraction of the allocations available for the service platform 304 compared to the total number of channels allocated to the service control point 312 (total_available, introduced above):

For each $SP\_index$ "$i$", $FAA(i)=AA(i)/\text{total\_available}$

As with Table AA, the values FAA(i) may be in either a floating point or fixed point format. Once each of the Table AA entries is filled by way of the information received from the various service platforms 304, each entry of Table FAA may be filled prior to generation of the routing list RL. Thus, the value of each FAA(i) is static during each time period.

Lastly, FIG. 12 illustrates a "fraction discrepancy" table (Table FD), which provides a value FD(i) representing a running difference between the fraction of total channels allocated and the fractional allocations available associated with each service platform 304 "i":

For each $SP\_index$ "$i$", $FD(i)=FA(i)-FAA(i)$

As with Tables FA and FAA, each entry FD(i) may take the form of a floating point or fixed point value. Prior to the generation of the routing list RL, each entry FD(i) is initialized with the negative of its associated fractional allocations available value, −FAA(i).

Figure 13:
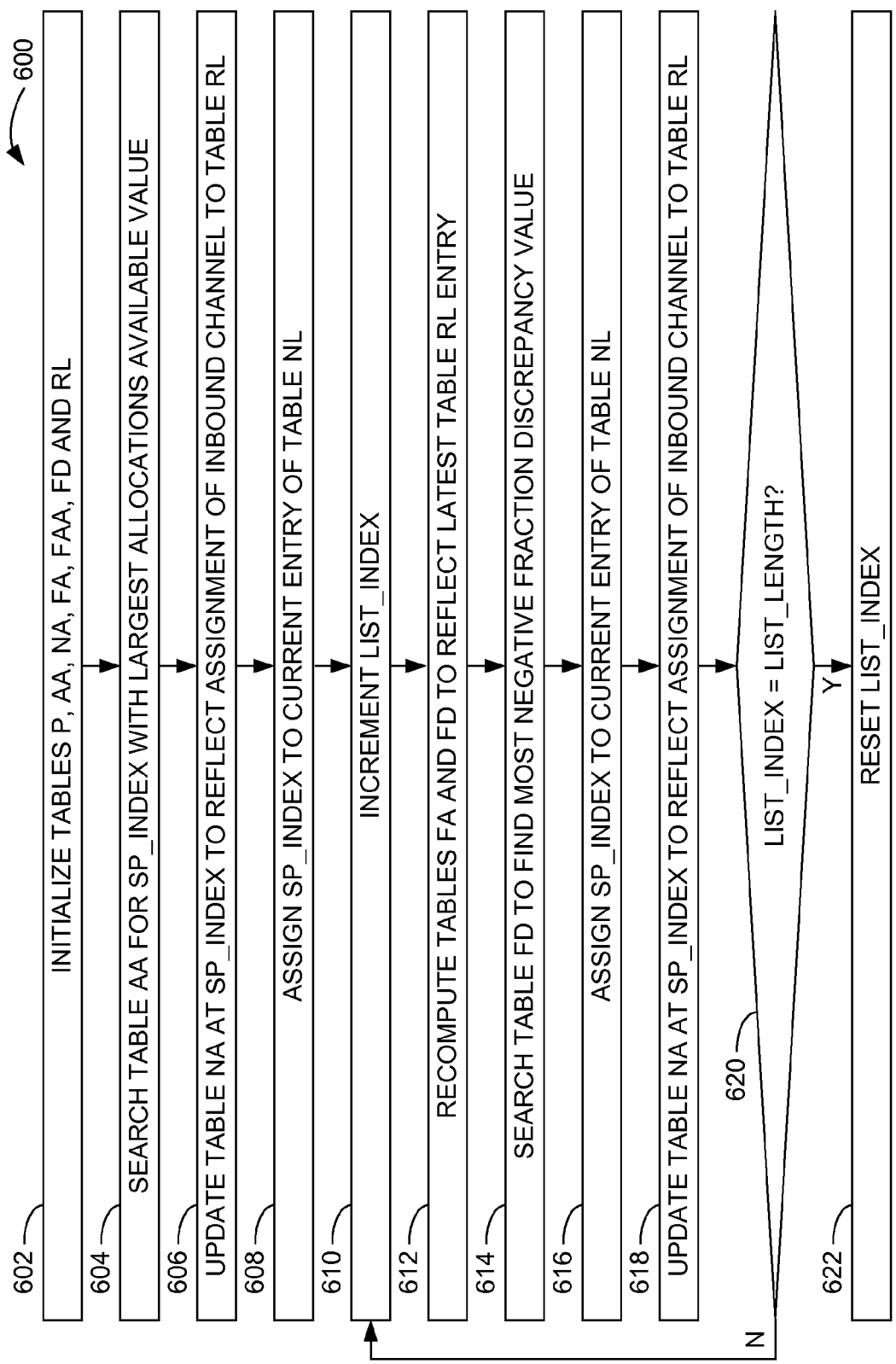
FIG. 13 is a flow diagram for a method of generating a routing list within a service control point according to an embodiment of the invention.

One embodiment of the actual generation 600 of the routing list RL is represented in the flow diagram of FIG. 13. Once each of Tables P, AA, RL, NA, FA, FAA, FD is initialized as described above (operation 602), Table AA is searched for the largest allocations available value AA(i) (operation 604). This value identifies the service platform 304 "i" having the highest number of channels allocated to the service control point 312. The associated SP_index "i" therefore identifies the service platform 304 which will be associated with the first entry of the routing list RL, and thus will be assigned the first incoming call of the current time period. Accordingly, the entry of Table NA associated with the SP_index is updated to reflect that an inbound channel of that service platform 304 is being assigned to the routing list RL (operation 606):

NA(SP_index)=1, and total_NA=1

Also, the service platform 304 denoted by SP_index is assigned to the first entry in the routing list RL, and the corresponding "used" flag is reset (operation 608):

list_index=1, RL(list_index).SP_index=SP_index, and RL(list_index).used=0

Continuing with the remainder of the routing list RL, the list_index is incremented (operation 610), and Tables FA and FD are recomputed to reflect the latest entry filled in the routing list RL (operation 612):

For each SP_index "i", FA(i)=NA(i)/total_NA and FD(i)=FA(i)-FAA(i)

To then fill each successive entry in the routing list RL, Table FD is searched to find the most negative fraction discrepancy value, FD(i) (operation 614). The associated index "i" resulting from the search is then employed as the next SP_index corresponding to a service platform 304 to be utilized as the next destination for an incoming call by entering that SP_index into the next available entry of the routing list RL (operation 616):

RL(list_index).SP_index=SP_index; RL(list_index).used=0

Also, Table NA is updated by incrementing the number of allocations for the associated service platform 304 and the total number of allocations (operation 618):

NA(SP_index)=NA(SP_index)+1; total_NA=total_NA+1

The list_index is then checked to determine if the last entry in the routing list RL has been encountered (operation 620). If so, the routing list RL is complete, and the routing list index list_index is reset to the start of the list (operation 622). Otherwise, control returns to operation 610, wherein the list_index is incremented, and the next service platform 304 for the next entry of the routing list RL is determined.

In following the method 600 of FIG. 13, the routing list RL substantially represents a distribution of calls to the inbounds channels according to the relative percentage of channels allocated by each of the service platforms 304 to the service control point 312. Further, the order of the entries of the routing list RL helps maintain this relative percentage of remaining available channels among the various service platforms 304. In other words, each entry is associated in order with the service platform 304 that has the smallest fraction of all inbound channels represented in the routing list RL at that point, compared to the fraction of all allocated inbound channels the platform 304 supplies to the service control point 312. As a result, a balanced utilization of each of the service platforms 304 relative to the number of available inbound channels for each platform 304 is essentially preserved, thus providing efficient connection of incoming calls to the platforms 304.

In one embodiment, after the routing list RL is generated, the service control point 312 issues a channel allocation response message to each of the service platforms 304, including the information discussed above regarding the number of call initiations for that specific service platform 304 during the previous timer period. In other implementations, the channel allocation response message may be issued earlier.

Figure 14:
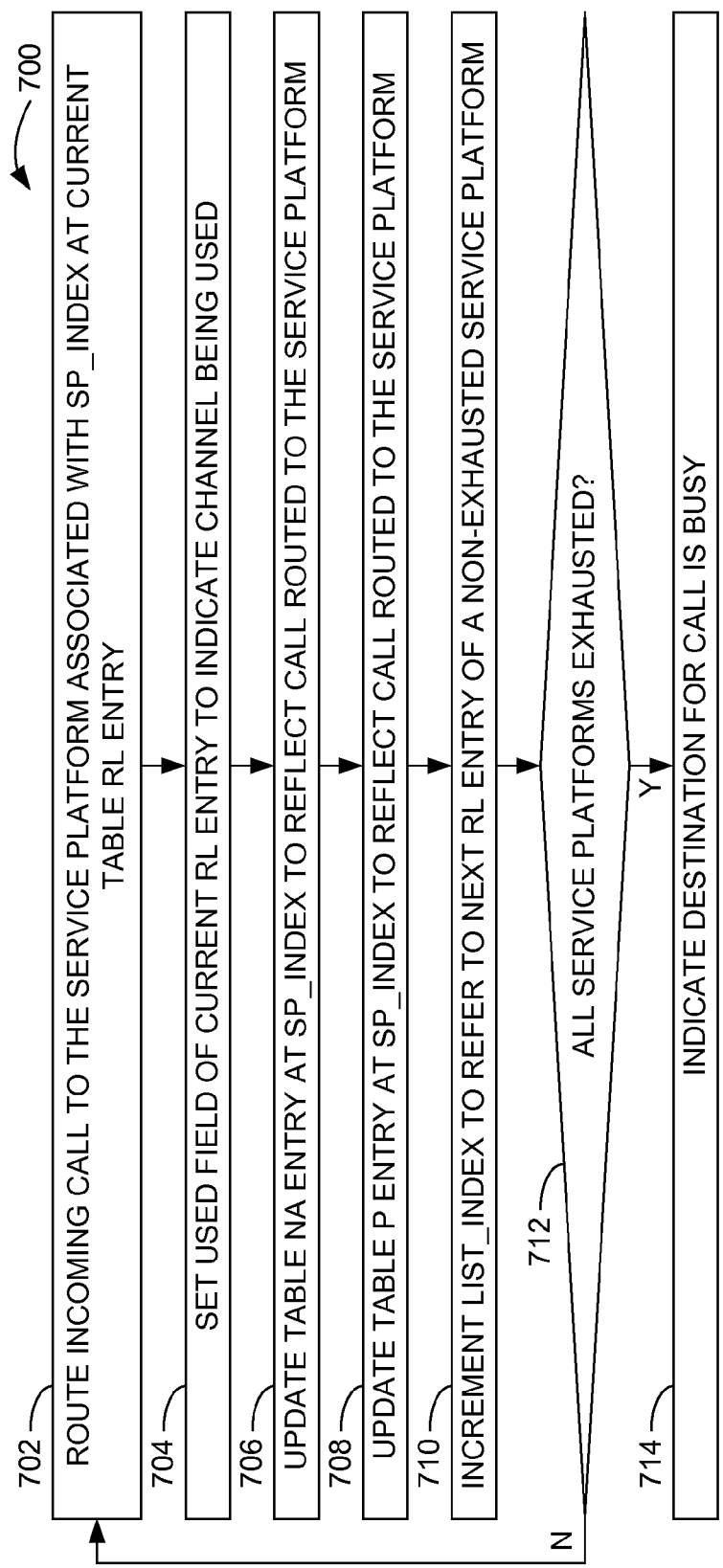
FIG. 14 is a flow diagram of a routing process according to an embodiment of the invention employing the routing list of FIG. 13.

Once the routing list RL is generated, use and maintenance of the routing list RL and various tables described above during the current time period progresses as facilitated by the structure of the routing list RL. A method 700 for a routing process employing the routing list RL described in detail above is represented in the flow diagram of FIG. 14. More specifically, for each incoming call during the current time period, the call is routed to the service platform 304 associated with the SP_index of the current routing list RL entry (operation 702). In addition, the "used" field of that routing list RL entry is set to indicate the call initiation (operation 704):

RL(list_index).used=1

Also, the entry of Table NA associated with the particular service platform 304 is decremented to indicate the fact that a call has been initiated onto one of the inbound channels of the service platform 304, thus reducing the number of available inbound channels of that platform 304 by one (operation 706):

NA(SP_index)=NA(SP_index)-1

Also, the entry of Table P corresponding to the SP_index of the service platform 304 involved in the current call initiation is updated to reflect the new call initiation (operation 708). More specifically, the initiations field of that particular Table P entry is incremented to reflect the latest call initiation to the service platform 304. Furthermore, if the new NA(SP_index) value is now zero, the entry of Table P corresponding to the SP_index is updated to indicate that the corresponding service platform 304 has no more available inbound channels, and is thus exhausted:

P(SP_index).inits=P(SP_index).inits+1; if NA(SP_index)=0, P(SP_index).exh=1

The routing list RL index list_index is then incremented to refer to the next entry in the list of a non-exhausted service platform 304 in a circular manner (operation 710). In one embodiment, list_index is incremented by one for each call initiation until the end of the list is reached, as none of the service platforms 304 referred to in the routing list RL is exhausted at that point. Once the end of the routing list RL is attained, list_index is reset to zero, and incrementing continues until a non-exhausted service platform 304 is encountered:

repeat((list$_{13}$ index=list_index+1)mod(list_length)) until P(RL(list_index).SP_index)).exh=0

If the inbound channels of all service platforms 304 become exhausted during the current time period (operation 712), the service control point 312 returns a signal to the calling telephone 10 that the destination of the call is busy (operation 714). Also, once the current time period has ended, indicated by receipt of the channel allocation messages from the service platforms 304, the process of generating the routing list RL, issuing channel allocation response messages to the service platforms 304, and routing calls based upon the newest routing list RL begins anew.

In one embodiment, one or more service platforms 304 may be logically grouped together as a "cluster." For example, each of several service platforms 304 within a cluster may provide the same application to process calls to one or more toll-free access numbers. Thus, service platforms 304 of different clusters may not serve the same set of access numbers, and thus may be treated as separate systems, and therefore serviced by different routing lists RL, even though different clusters may be serviced by the same service control points 312.

In various embodiments described above, the information exchanged between the service control points 312 and the service platforms 304 allows generation and subsequent access of the routing list RL within the service control points 312 to route each incoming call to an appropriate platform 304. Thus, a dedicated routing processor external to the service control points 312 need not be employed, thus eliminating communication exchange between a service control point 312 and an external routing processor for every incoming call bound for one of the service platforms 312. This reduction in communication typically increases call handling throughput through the telephone system 300. For example, previous telephone systems employing an X.25 interface between a service control point and an external routing processor allowed approximately 35 calls per second per X.25 link, while at least some embodiments of the present invention are expected to allow about 100 calls per second.

Also, as a result of the periodic communication exchange between the service control points 312 and the service platforms 304 of dynamic routing factors, such as the number of inbound channels available for each service platform 304, the telephone system 300 is capable of quickly adapting to changes in device availability, traffic congestion, and the like.

In other embodiments, more statically-oriented routing factors may also be employed in embodiments of the invention to provide additional functionality. For example, incoming calls may be redirected via the service control point 312 to a particular cluster or set of service platforms 304 by way of an option flag settable online via an IP interface. Also, the service control point 312 may also possess the ability to block calls according to the Numbering Plan Area (NPA) (area code) or Automatic Number Identification (ANI) II digits of the source of the incoming call. Further, each service control point 312 may set preferred NPAs for each service platform 304 based on geographic location or other factors. Reassigning a service platform 304 from one cluster to another is also possible in some embodiments.

Embodiments of the invention generally may be implemented in hardware, in software or firmware providing instructions executed on a processor, or some combination thereof. Such processors might include general-purpose computing systems, computing systems designed for a specific purpose, microprocessor-based or microcontroller-based embedded systems, and any other algorithmic-based processing systems capable of executing the instructions of the software or firmware.

While several embodiments of the invention have been discussed herein, other embodiments encompassed within the scope of the invention are possible. For example, while particular mention has been made of telephone systems employing toll-free access numbers for the use of customers to contact agents of a particular company, other telephone systems not utilizing toll-free access numbers or involving a single company may also benefit from various embodiments. In addition, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. A method of distributing incoming telephone calls among inbound links of a service platform, the method comprising:
    in the service platform:
        accumulating call initiation information regarding routing of the incoming telephone calls to the inbound links of the service platform by a plurality of network call processors during a previous time period;
        generating first allocation information comprising a first number of the inbound links of the service platform allocated to a first network call processor of the plurality of network call processors for a future time period based on the call initiation information; and,
        generating second allocation information comprising a second number of the inbound links of the service platform allocated to a second network call processor of the plurality of network call processors for the future time period based on the call initiation information;
    in the first network call processor, generating first instructions to route a first number of the inbound telephone calls to the first number of the inbound links of the service platform during the future time period based on the first allocation information; and,
    in the second network call processor, generating second instructions to route a second number of the inbound telephone calls to the second number of the inbound links of the service platform during the future time period based on the second allocation information.

2. The method of claim 1 further comprising transferring the first allocation information from the service platform for delivery to the first network call processor.

3. The method of claim 2 further comprising transferring the second allocation information from the service platform for delivery to the second network call processor.

4. The method of claim 1, wherein the plurality of network call processors comprise service control points.

5. The method of claim 1, wherein the inbound links comprise time-division-multiplexed channels.

6. The method of claim 1, wherein the inbound links comprise packet addresses.

7. The method of claim 6, wherein the packet addresses comprise Internet Protocol packet addresses.

8. The method of claim 1, wherein the call initiation information comprises a number of call initiations to the inbound links of the service platform by each of the plurality of network call processors during the previous time period.

9. The method of claim 1, wherein the incoming telephone calls are toll-free access telephone calls.

10. The method of claim 1, wherein the service platform comprises a call center.

11. A communication system for distributing incoming telephone calls among inbound links comprising:
    a service platform configured to:
        accumulate call initiation information regarding routing of the incoming telephone calls to the inbound links of the service platform by a plurality of network call processors during a previous time period;
        generate first allocation information comprising a first number of the inbound links of the service platform allocated to a first network call processor of the plurality of network call processors for a future time period based on the call initiation information; and, generate second allocation information comprising a second number of the inbound links of the service platform allocated to a second network call processor of the plurality of network call processors for the future time period based on the call initiation information;

the first network call processor in communication with the service platform and configured to generate first instructions to route a first number of the inbound telephone calls to the first number of the inbound links of the service platform during the future time period based on the first allocation information; and, the second network call processor in communication with the service platform and configured to generate second instructions to route a second number of the inbound telephone calls to the second number of the inbound links of the service platform during the future time period based on the second allocation information.

12. The communication system of claim 11 wherein the service platform is further configured to transfer the first allocation information from the service platform for delivery to the first network call processor.

13. The communication system of claim 12 wherein the service platform is further configured to transfer the second allocation information from the service platform for delivery to the second network call processor.

14. The communication system of claim 11, wherein the plurality of network call processors comprise service control points.

15. The communication system of claim 11, wherein the inbound links comprise time-division-multiplexed channels.

16. The communication system of claim 11, wherein the inbound links comprise packet addresses.

17. The communication system of claim 16, wherein the packet addresses comprise Internet Protocol packet addresses.

18. The communication system of claim 11, wherein the call initiation information comprises a number of call initiations to the inbound links of the service platform by each of the plurality of network call processors during the previous time period.

19. The communication system of claim 11, wherein the incoming telephone calls are toll-free access telephone calls.

20. The communication system of claim 11, wherein the service platform comprises a call center.

* * * * *